United States Patent Office 3,252,863
Patented May 24, 1966

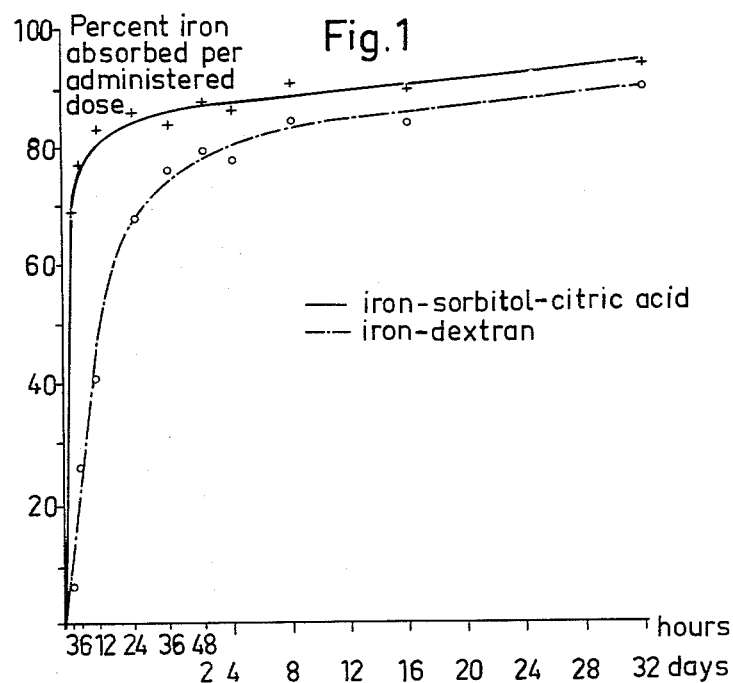
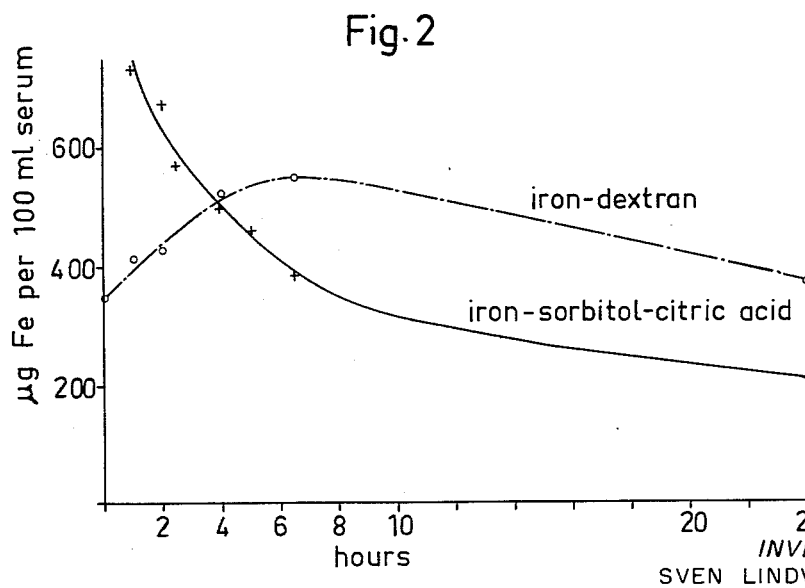

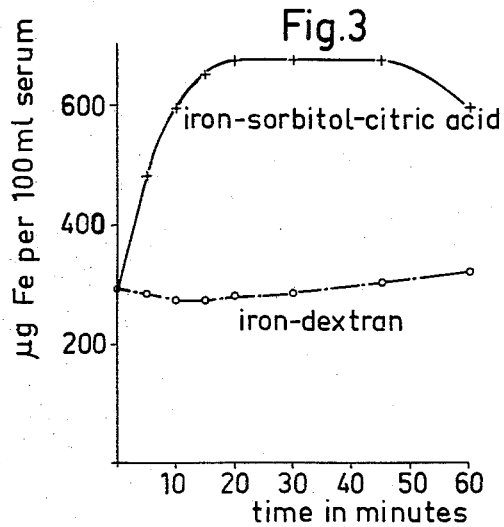
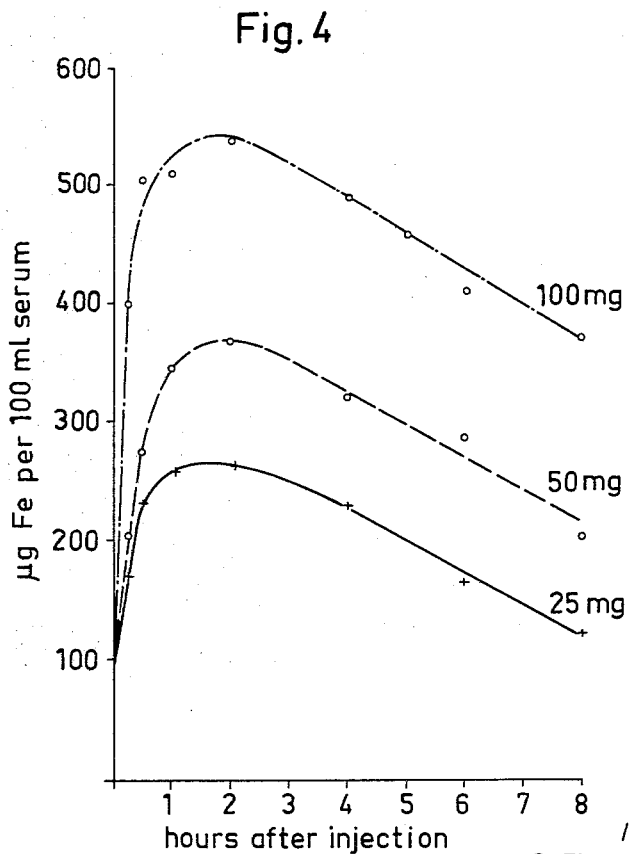

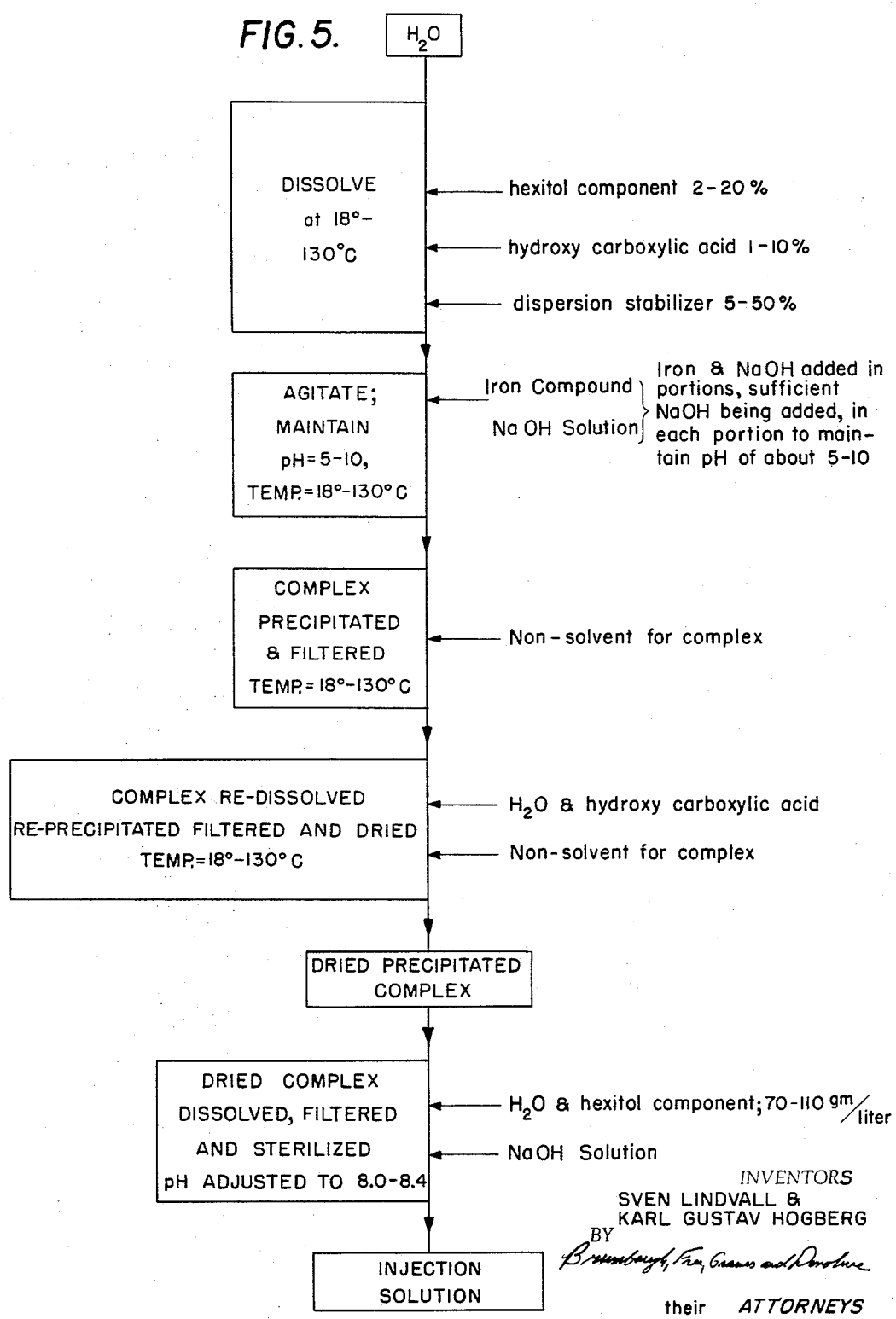

3,252,863
IRON PREPARATIONS FOR INTRAMUSCULAR
INJECTION
Sven Lindvall and Karl Gustav Högberg, Sodertalje, Sweden, assignors to Aktiebolaget Astra Apotekarnes Kemiska Fabriker, Sodertalje, Sweden, a company of Sweden
Filed Feb. 17, 1961, Ser. No. 90,004
Claims priority, application Sweden, Oct. 26, 1960, 10,317/60
20 Claims. (Cl. 167—68)

This invention relates to iron preparations suitable for intramuscular injection and to a method for the manufacture of such preparations.

In certain states of iron deficiency, e.g. those that do not react satisfactorily to perorally administered iron or that do not tolerate such treatment, iron must be administered parenterally in order to obtain a sufficiently prompt therapeutic response. There are many iron preparations for intravenous injection on the market. One of these consists substantially of an aqueous solution of saccharated oxide of iron; another consists of an aqueous solution of a high molecular weight neutral complex of iron and a carbohydrate. When iron is injected intravenously, almost full use of the injected iron is obtained, but this method involves a considerable number of disadvantages, for example the injection itself must be carried out according to a special injection technique which requires great skill to avoid paravenous injection (i.e. injection outside the vein) in which case intense pain and lasting discoloration are caused. Another disadvantage is that the patient must not have bad or deep-lying veins. Occasionally other injuries, and even death caused by shock, have occurred as a result of the intravenous injection of a solution of saccharated oxide of iron.

Although the iron preparations for intravenous use may be administered intravenously without any serious toxic effect, for various reasons they ar eunsuitable for intramuscular or subcutaneous injections. Thus, the saccharated oxide of iron mentioned above has a high osmotic pressure and basic reaction, which give rise to pain during injection, inflammation and unsatisfactory resorption.

At the present time there are only a few iron preparations known which may be used for intramuscular injection. Some of these preparations, however, have certain disadvantageous side effects, some of which might be of a rather serious character.

The present invention provides an intramuscularly injectible iron preparation for use in human and veterinary medicine which is not subject to the drawbacks of the older preparations, gives very prompt resorption, is free from local reactions or injuries to the tissues and gives a good haematologic response. The preparation of the invention moreover has no tendency to cause sarcoma at the injection site even after repeated injections.

The new iron preparations of the invention comprise a dispersion in water of a complex of 3-valent iron and two different nontoxic, complex forming components, one of which comprising a hexitol or hydroxypropyl sorbitol or by a mixture of any two or more of these, the other one comprising a hydroxy carboxylic acid; the dispersion contains a physiologically innocuous water soluble stabilizer for the dispersion. The invention also includes dry compositions comprising as the active constituent an iron complex of the type described, from which compositions the new iron preparations can readily be prepared.

The new iron preparations of the invention are readily soluble at physiological pH values and are sufficiently stable for sterilisation by autoclaving.

The iron in the preparation must be in the trivalent form since ferrous compounds do not give the desired stability. For the preparation of the complex the following ferric compounds are suitable: Water soluble ferric salts, e.g. ferric chloride, nitrate, sulphate, and acetate, and double salts, such for example as ferric ammonium sulphate, as well as their chemical equivalents.

Of these the preferred compound is ferric chloride.

The dry compositions preferably contain 5–30%, especially 12–16%, by weight, of iron and the injectible solutions preferably contain 5–60 milligrams of iron per millilitre, especially about 50 milligrams of iron per millilitre. It is, of course, desirable that the iron concentration in the injection solution should be as high as possible, in order that the injected volume may be small. In some cases, however, less concentrated preparations may be more suitable.

The hexitol-component of the complex should be able to form a complex with 3-valent iron in water solution at pH:s in the range of 5–10 preferably at 8.0–8.4. The hexitol-component in the present invention is selected from the group consisting of sorbitol, mannitol, dulcitol, iditol and hydroxypropyl sorbitol. The amount thereof employed should be sufficient that when an amount of the complex containing from 5 to 60 milligrams of iron is dispersed in 1 millilitre of water, the resulting dispersion contains from about 10 to about 300 milligrams of the hexitol-component.

The hydroxy carboxylic acid component of the complex must be derived from a hydroxy carboxylic acid which is nontoxic and will form a complex with 3-valent iron at pH values in the range of 5–10. Citric acid and gluconic acid are preferred, but also such acids as tartaric acid and malic acid may advantageously be used. Lactic acid may also be used, but this acid has not quite as good properties as the acids of the two just mentioned groups. The amount of the hydroxy carboxylic acid component should be sufficient that when an amount of complex containing between about 5 and about 60 milligrams of iron is dissolved in 1 millilitre of water, the resulting dispersion will contain between about 10 and 70 milligrams of hydroxy carboxylic acid.

As dispersion stabilizers dextrins containing a number of reducing groups corresponding to 40–200 milligrams of glucose, per gram of dextrin are preferred because of their good compatibility in the organism, but other water soluble carbohydrates may conveniently be used, e.g. glucose, saccharose or low molecular weight dextran fractions. The dispersion stabilizers should constitute between about 40% and about 90% of the dry complex. In an injection solution containing between about 5 and about 60 milligrams of iron per millilitre, there should be between about 150 and 350 milligrams per millilitre of dispersion stabilizer.

Although the molecular size and structure of the active iron complex present in the composition is not fully determined, it is probable that the composition contains a complex in which both the hydroxy carboxylic acid component and the hexitol component are bonded directly to the iron atom, and that the preparation forms a low molecular weight dispersion in water, with an average molecular weight not exceeding 5000.

The particle size of the new iron compositions should preferably be such that at least the major part, and especially more than 90%, by weight of the particles have a sedimentation constant less than $17 \times 10^{-13}$ sec., preferably less than $14 \times 10^{-13}$ sec., the sedimentation constant being determined from a physiological saline solution containing 1 milligram of iron per millilitre in an ultra centrifuge 900 seconds after the rotor has attained a constant speed of 59,780 revolutions per minute. By electrophoresis of a solution of the preparation, the latter can be divided into three iron-containing constituents at least two of which contain the iron in complex form and migrate slowly towards the anode. The most rapidly migrating of said two migrating complex iron constituents, which amounts to about 6%, is dialysable.

The new iron preparations can be prepared directly, but it will usually be preferred to prepare the dry composition first and then to make the preparation as required, autoclaving the dispersion to sterilise it before use. By use of the latter procedure, storage of the preparation for a long period of time is made possible since the dry composition is very suitable for storage.

The dry composition can for instance be prepared in the following way. An aqueous solution of the ferric compound is added, usually with stirring, to an aqueous solution, which may be at a temperature of 18–130° C. preferably 50–70° C., containing the hexitol-component (e.g. 2–20%) and the carboxylic acid (e.g. 1–10%) and, if required, the physiologically innocuous dispersion stabilizer (e.g. 20–50%). (Except where otherwise stated, all proportions in this specification are by weight.) The ferric compound is preferably added in amount sufficient to provide at the most 35 moles, preferably at least 1 mole, of ferric compound per mole of hexitol-component. The ferric compound is preferably added in portions and the pH of the solution adjusted to 5–10, preferably 7, after the addition of each portion.

After cooling of the mixture to ambient temperature, precipitation is effected, preferably by adding alcohol or another non-solvent for the complex, e.g. in an amount two to four times the volume of the mixture. The precipitate formed is separated, purified by repeated solution, precipitation and washing, and finally dried. If the solution is to be used directly, the complex is not precipitated and the solution is sterilised before it is used.

During purification of the precipitate, resolution is conveniently carried out with water mixed with a small amount of the complex-forming hydroxy-carboxylic acid. When solution is complete, the pH is again adjusted to 5–10. The solution so formed is heated to about 60° C., and the precipitate is added thereto while stirring. As washing liquid for the precipitate alcohol is conveniently used.

The purification is necessary in order to obtain a sufficient degree of purity for intra-muscular injection without any risk of side effects. After the purification process, the preparation obtained can be desiccated, preferably in vacuo.

When preparing an injection solution a certain amount of the hexitol-component is preferably added to the distilled water used to make the solution. This additional amount of hexitol-component is useful because some of the hexitol is lost during the different purification stages in preparing the dry preparation. Thus an injection solution can be made by preparing an aqueous solution containing 70–110 grams of hexitol-component per litre of solution, heating the solution to about 60° C. while stirring and then adding the dry preparation in portions while stirring is continued until the solution attains the desired concentration of iron. When all the dry preparation has been added, the solution is kept at 60° C. for another hour while the stirring is continued. Then, the pH of the solution is adjusted to 8.0 to 8.4, preferably to 8.2, and the solution is cooled to ambient temperature, filtered, dispensed and sterilized in an autoclave at 120° C. for about 20 minutes.

According to experiments carried out the degree of absorption attained seems to be independent of the pH value of the injection solution prior to autoclaving, provided that this pH is between 5 and 10. It has been ascertained that the pH of the injection solution changes during the autoclaving in a way such that high pH values decrease and low pH values increase. In order to obtain a pH value of about 7.5, i.e. the pH value in the musculature and blood, the pH of the injection solution prior to the autoclaving should be between 8.0 and 8.4. A pH value of 8.2 has proved to be especially suitable.

For further understanding of this invention, reference may be had to the attached figures in which:

FIGURE 1 shows comparatively the absorption of iron as a function of time at the injection site using injection solutions of the present invention and of the prior art;

FIGURES 2 and 3 show the blood serum iron as a of time following injection in rabbits of solutions according to the present invention and according to the prior art;

FIGURE 4 shows the blood serum iron as a function of time following injection in man of solutions according to the present invention; and FIGURE 5 shows schematically the process for making the precipitated iron complex and iron injection solutions of the present invention.

Extensive investigations have been carried out to find out the properties of the preparations under the conditions of use, and at the same time the preparations have been subjected to pharmacological and clinical investigations.

Precipitation tests have proved that the preparation is fully stable at the pH value of the blood. No haemolytic effect has been indicated. The effect of the preparation on the coagulation of the blood has been determined in vivo in rabbits in doses corresponding to the therapeutic doses for man, as well as in vivo in man; no effect on the coagulation was observed within one hour after the injection.

The acute toxicity of the preparation was determined by subcutaneous and intravenous administration to white mice. Male animals with a weight of 17–24 grams were used. The concentrations of the injected solutions, which were diluted with physiological saline solution, corresponded to 0.5% iron. The number of animals in each test was between 120 and 160: 420 animals were used in all. The observation period was 7 days. The LD50 (medial lethal dose) in subcutaneous administration corresponded to 36 milligrams per kilogram body weight, in intraperitoneal administration to 50 milligrams per kilogram body weight and in intravenous administration to 35 milligrams per kilogram body weight. There was no statistically significant difference between these three routes of administration. The toxicity was also determined by intramuscular administration in rats and intramuscular and intravenous administration in rabbits, and the obtained values of LD50 were of the same magnitude as the doses for mice.

No antigenic properties have been observed, which is of practical importance, since the undesired systemic reactions reported with the older preparations probably are of allergic origin.

The transport of iron from the site of injection was examined after the injection of solutions of the preparation as well as after injection of solutions containing a commercial iron-dextran complex. Deep intragluteal injections were made in doses of 20 milligrams Fe (0.4 millilitre) per kilogram body weight in rabbits weighing 2–3 kilograms. At different times after the injections the animals were killed and the gluteal muscles dissected from the leg. Musculature and skin around the injection site were wet oxidized with sulphuric acid and nitric acid, and the iron content was then determined by means of a colorimetric rhodanide method. It was found that the preparation was absorbed very rapidly, 70% of the iron supplied having been removed from the injection site only 3 hours after the injection, whereas in the same time only 5% of the commercial iron-dextran complex was absorbed. The so-called "rapid absorption phase" of the preparation of the invention was complete after about 24 hours, when about 15% of the injected iron was left at the injection site, whereas this phase for the commercial iron-dextran complex was still incomplete after about 72 hours, when about 20% of the iron remained in the muscle (see FIG. 1 of the accompanying drawings, in which the percentage of iron absorbed is plotted against time).

The iron content of serum was determined in experiments with rabbits at different times after the intramuscular injection of the preparation of the invention and of iron-dextran in doses of 1.5 milligrams of iron per kilogram body weight. Deep intragluteal injections were made and then blood samples were taken from the border vein of the ear. The iron content in 1 cc. of the serum was determined principally by the method described by Heilmeyer and Plötner (1937). The results are seen in FIG. 2, of th drawings in which the amount of iron in milligrams per 100 cc. of serum is plotted against the interval of time after the injection in hours. As may be seen the resorption of intramuscularly injected iron from the preparation according to the invention is very rapidly reflected in an increase of the iron in the serum. With the iron-dextran complex an increase of the serum iron is also obtained, but the maximum values are not reached until after at least 6 hours. In order to investigate the conditions during the first hour after the injection in more detail, more blood samples were taken in another test during this time. The results are shown in FIG. 3 of the drawing, from which it appears that the maximum iron level of the serum with the preparation according to the invention was reached after only about 20 minutes and that this maximum value remained unchanged for about another 30 minutes after the injection. The values determined after the injection of the iron-dextran preparation did not show any appreciable increase during this period of time.

Corresponding tests have also been carried out with the preparation of the invention in man and the results of these tests are shown in FIGURE 4 of the drawings. 25, 50 and 100 milligrams of iron were given deep intramuscularly in the gluteal area of 12 healthy persons. Blood samples from the vein were taken before, and at varying periods after the injections. As is apparent from the graphs the iron content of the serum increased immediately after the injection, reached its maximum after about 2 hours and then decreased gradually.

Tests were also carried out in man in order to determine the unsaturated iron binding capacity of the serum (UIBC), a method published by Cartwright and Wintrobe (1949) being employed. The results show that the UIBC was decreased as a consequence of the injections. The iron-binding capacity of the transferrin was most pronounced after doses of 50 and 100 milligrams. The preparation of the invention thus contains an iron component of such properties that it can react immediately with transferrin, and it differs in this respect also from commercial iron-dextran.

In order to determine the tolerance of the preparation, its therapeutic effect and possible side effects, clinical investigations have been carried out in which the preparation has been compared with a solution containing iron-dextran. Both preparations contained 50 milligrams of iron per cc. and where given deep intramuscularly in the gluteal region in doses of 100 milligrams of iron per injection. The injections were given daily on alternating sides over a period of 10 days (total 1000 milligrams iron). The sample consisted of 65 patients with conventional clinical criteria for stabilised iron deficiency and very varying degrees of anaemia. For the evaluation of the therapeutic effect, the sample was therefore divided into three subgroups. Every other patient was treated with the preparation of the invention and the rest with iron-dextran. In these investigations the Hb-values (haemoglobin value), erythrocyte count, reticulocyte count, and serum iron were determined and the sedimentation rate, urinary sediment, non-protein and liver and renal functions were continuously checked. The therapeutic effect was evaluated by determination of reticulocyte count and increases of haemoglobin and serum iron. The values obtained for reticulocyte count, haemoglobin increase and increase of serum iron were substantially identical for both of the preparations in the three sub-groups of patients.

During the time of investigation, side effects such as rise in temperature, nausea, vomiting and ague were also recorded.

In the group of 35 patients treated with iron-dextran, in one patient a systemic reaction consisting of a temperature rise to 38.2° C. was noted after the last injection. Another patient had to discontinue the treatment owing to the intense local reactions at the injection site combined with a general feeling of illness and temperature increase to about 38° C. Besides these two patients, six others reported pain not only at the injection site, but throughout the thigh; four of these were obliged to rest and two of them had to stay in bed for a couple of days. In these two last-mentioned cases, the buttocks and thighs showed a pronounced redding and intense tenderness though local discoloration of the skin at the injection site was not observed; this may have been due to the fact that the dose of iron was low (100 milligrams per injection). Systemic reactions were thus observed in about 23% of the patients treated with iron-dextran.

In the group of patients treated with the preparation of the invention, a slight local reaction was observed in 5 of 40 of the patients immediately after the injection; this showed itself in a feeling of tension and a moderate tenderness on palpation at the injection site, and was probably due to the hypertonic effect of the preparation. The tenderness diminished in a short time and was comparable with the feeling after an intramuscular vitamin or pencillin injection. In no case, was the reaction such that the treatment had to be discontinued. No discoloration of the skin or sign or local irritation was observed in any case. Two patients outside this sample batch tolerated the preparation in spite of very reduced renal functions.

Summing up, it has thus been ascertained that the absorption of the new preparation from the muscle is very rapid, substantially more so than that of iron dextran. The good absorbtion is reflected in an increase of iron in the serum, which is substantial after only 5 minutes and after about 20 minutes has reached a maximum, whereas the iron-dextran does not reach its maximum until after many hours. The iron-dextran is thought to be absorbed through the lymphatic vessels and to be independent of the local focus of inflammation caused by it at the injection site (so-called reactive absorption). It is probable that the high molecular weight constituents of the preparation of the invention, which, however, have considerably lower molecular weight than the iron-dextran, are also absorbed lymphatically to a certain degree, while the low molecular weight constituent may be absorbed through the blood vessels also. The main part of the iron in the preparation of the invention is present as constituents, which are absorbed immediately, without the need of any local inflammatory irritation process to be started first and this may be due to the molecular weight being lower than that of the iron-dextran. Besides these iron contsituents, the new preparation contains also a small amount of dialysable iron which has the capacity of forming complexes with transferrin. This dialysable iron is of special importance since the iron-transferrin complex can be used directly in the erythropoissis; the higher molecular constituents may be absorbed by the recticuloendothelial system for further rearrangement and metabolism.

The invention is illustrated by the following examples.

EXAMPLE 1

*Preparation of dry composition*

30 cc. of 70% (by volume) sorbitol were dissolved in 225 cc. of distilled water, after which 75 grams of dextrin were added and the mixture was heated to 60° C. while stirring. On solution of the dextrin, 10.5 grams of crystallised citric acid were added. 45 grams of sodium hydroxide were dissolved in 225 cc. of distilled water (solution III) and from this solution 22.5 cc. were added to the first-mentioned solution of sorbitol, dextrin and citric acid (solution I). Then solution II, which contained 84 grams of ferric chloride hexahydrate dissolved in 115 cc. distilled water, was added to solution I in 8 portions while solution I was stirred and kept at a temperature of 60° C. After each of these additions, the reaction mixture was neutralised with 23 cc. of solution III. The time for each addition was one minute. After the eighth neutralisation the pH was 6.95. This was adjusted to 8.2 by addition of 7.3 cc. of solution III. The solution was heated with stirring for a further 30 minutes, and then cooled to 30° C. and diluted to a volume of 675 cc. with distilled water.

To the diluted solution 2025 cc. of 83% (by volume) ethanol was added while the solution was stirred and the stirring was continued for a further 5 minutes. When the precipitate formed had settled, the mother liquor was decanted and the precipitate was washed with 150 cc. of 66% ethanol. The washed precipitate was dissolved at a temperature of 60° C. in 450 cc. of distilled water containing 3 grams of crystallized citric acid, after which the pH was adjusted to 8.2 with 2 cc. of solution III. After half an hour the solution was cooled to 30° C. and was filtered through double filter papers and diluted to a volume of 675 cc. with distilled water.

To the filtered solution 2025 cc. of 83% ethanol were added while the solution was stirred. The stirring was continued for 10 minutes after which the precipitate formed was allowed to settle. After 20 minutes the mother liquor was poured off. The precipitate was washed twice with 63% ethanol and three times with undiluted ethanol, and then dried in vacuo at a temperature of 45-50° C. 100 grams of the dry preparation with an iron content of 16.1% were obtained.

*The preparation of injection solution*

15 cc. of 66.7% sorbitol were dissolved in 105 cc. of distilled water and heated to 60° C. 47.0 grams of the dry preparation were added in portions with stirring, after which the mixture, while still being stirred, was kept at 60° C. for a further hour. The pH of the solution was 7.85. The solution was cooled to room temperature and then diluted with distilled water to a volume of 150 cc. The diluted solution was filtered through a thin layer of refined filtering aid (Theorit No. 3) on double filter paper in a Nutsche. The filtered solution was filtered again through a Celas filter under sterile conditions, and dispensed in ampoules, which were then sterilised in an autoclave at 120° C. for 20 minutes. The sterilised iron solutions had a total iron content of 51.2 milligrams per cc., a pH value of 7.4, a viscosity of 9.6 centipoises at 20° C. and a freezing point depression of 2.44° C.: there were sterile, non-pyrogeneous and gave an absorption of 86% on rabbit after injection of a dose of 20 milligrams of iron per kilogram body weight.

EXAMPLES II–VII

Absorption tests with varying contents of the hexitol in the dry preparation were carried out, no further addition of hexitol being made during the preparation of the injection solution. Otherwise the process was identical with that described in Example I. The results are shown in the following table:

TABLE I

|   | Millilitres of 70% sorbitol per kilogram of dry preparation | Absorption from the rabbit muscle, percent |
|---|---|---|
| II | 34 | 43 |
| III | 100 | 47 |
| IV | 155 | 62 |
| V | 300 | 72 |
| VI | 557 | 74 |
| VII | ¹ 260 | 81 |

¹ Grams of pulverised anhydrous sorbitol.

EXAMPLE VIII

A dry preparation was made in the way described in Example I, except that no complex-forming carboxylic acid was added and that the base and the iron were added in portions, the base being added prior to the addition of the iron. When all the iron had been added the pH was adjusted to 9.8. After the first precipitation with 4 volumes of alcohol the precipitate was redissolved in pure water. The pH of the solution obtained was 10.4, which was adjusted to 9.5 with 2 N HCl, after which by reprecipitation, washing and drying, a dry preparation was made in the way described in Example I. From this dry preparation there was then made a sterile injection solution in the way described in Example I, a further addition of sorbitol corresponding to 100 cc. of a 70% sorbitol solution per litre of injection solution being made. The solution gave an absorption from the rabbit muscle of 45%.

EXAMPLE IX

A dry preparation was made substantially as described in Example VIII, except that citric acid in an amount corresponding to a content of 28.9 grams per kilogram of the dry preparation was added to the reaction mixture and that the iron solution was added prior to the addition of the base. When the ferric compound and the base had been added, the pH value of the mixture was adjusted to 9.9 and the precipitation was carried out with 4 volumes of ethanol. After solution in distilled water, reprecipitation with ethanol, washing and drying, a dry preparation was obtained from which an injection solution was made in the way described in Example VIII. This solution gave an absorption from rabbit muscle of 49%.

EXAMPLE X

A dry preparation was made in the way described in Example IX except that 71.7 grams of citric acid were added per kilogram of dry preparation and the pH value was adjusted to 8.2 in the reaction mixture after the addition of the ferric compound. Then a sterile injection solution was made in the way described in Example VIII from the dry preparation obtained. This injection solution had an absorption of 78% from rabbit muscle.

EXAMPLE XI

A dry preparation was made in the way set forth in Example X, except that 97.7 grams of citric acid were added per kilogram of dry preparation. A sterile injection solution was prepared from the dry preparation in the way described in Example VIII and gave an absorption from rabbit muscle of 81%.

EXAMPLE XII

A dry preparation was made in the way set forth in Example X, except that 100 grams of citric acid per kilogram of dry preparation were added to the reaction mixture, and that when the precipitate was redissolved prior to reprecipitation, a further 28.7 grams of citric acid per kilogram of dry preparation were added. A sterile injection solution prepared in the way described in Example VIII gave an absorption of 92% from rabbit muscle.

EXAMPLE XIII

A dry preparation was made in the way described in Example X, except that 92.3 grams of citric acid per kilogram of dry preparation were added to the reaction mixture, and that when the precipitate was redissolved prior to reprecipitation a further 92.3 grams of citric acid were added per kilogram of dry preparation. A sterile injection solution made in the way described in Example VIII gave an absorption of 94% from rabbit muscle.

EXAMPLE XIV

A dry preparation was obtained in the following way. 21.0 grams of mannitol and 75.0 grams of dextrin were dissolved in 225 cc. of distilled water. On solution of these two ingredients at 60° C. 10.5 grams of citric acid were added. To the solution formed 22.5 cc. of a solution containing 45.0 grams of sodium hydroxide in 225 cc. of distilled water were added. Then, 84.0 grams of ferric chloride hexahydrate dissolved in 115 cc. of distilled water were added in eight portions. After the addition of each portion 23 cc. of the sodium hydroxide solution were added to the reaction mixture. On completion of the addition of iron and base the pH of the reaction mixture was adjusted to 8.25. The reaction mixture was kept at 60° C. for a further period of about 30 minutes, after which the mixture was cooled to room temperature, diluted to 675 cc. and mixed with 2.7 litres of 83% ethanol. After the precipitate had settled the mother liquor was removed and the precipitate was treated with 150 cc. of alcohol diluted to the same concentration as the mother liquor. The precipitate was sucked dry on a Nutsche after which it was dissolved, with stirring at a temperature of 50° C., in 450 cc. of distilled water containing 3 grams of crystallised citric acid. The pH value was adjusted to 8.3 and the heating was continued for some minutes. Then the solution was cooled to 30° C., filtered, diluted to 675 cc. and again precipitated with 2.7 litres of 83% alcohol. After half an hour, the mother liquor was sucked off and the precipitate was washed twice with 150 cc. of alcohol solution of the same concentration as the mother liquor and three times with undiluted ethanol. The washed precipitate was dried for 15 hours in vacuo at a temperature of 45–50° C. The yield was 110 grams of the dry preparation, which had a total iron content of 15.9%.

47.0 grams of the dry preparation obtained were added in portions to a solution of 10.5 grams of mannitol in 105 cc. of distilled water at a temperature of 65° C. while stirring. After one hour the solution obtained was cooled to room temperature and diluted with distilled water to 150 cc. The solution was then filtered through filter paper and a sterile filter and dispensed in ampoules which were sterilised in an autoclave at a temperature of 120° C. for 20 minutes. The solution, which was ready for injection, had a total iron content of 48.3 milligrams per cc. and a pH of 7.65, and gave an absorption of 75% from rabbit muscle.

EXAMPLE XV

A dry preparation was obtained in the following way, 7.0 grams of crystallised dulcitol and 25.0 grams of dextrin were dissolved in 75 cc. of distilled water at 45° C.; 3.5 grams of citric acid were then added. To the solution formed 7 cc. of a solution of 15.0 grams of sodium hydroxide in 75 cc. of distilled water were added. Then a solution of 28.0 grams of ferric chloride hexahydrate was dissolved in 38 cc. of distilled water was added in 8 portions with stirring and continued heating. After the addition of each portion 7.5 cc. of the sodium hydroxide solution were added to the reaction mixture. On completion of the addition of ferric chloride and base, the pH of the reaction mixture was adjusted to 8.25. The mixture was kept at a temperature of 45° C. for a further 30 minutes, after which it was cooled to room temperature, diluted to 225 cc. and mixed with 900 cc. of 83% ethanol. On settling of the precipitate, the mother liquor was removed and the precipitate was then treated with 50 cc. of alcohol diluted to the same concentration as the mother liquor. The precipitate was sucked to dryness on a Nutsche and was then dissolved at a temperature of 60° C. in 150 cc. of distilled water containing 1.0 gram of crystallised citric acid. The pH value was adjusted to 8.3 and the heating was continued for some minutes. The solution was then cooled to 30° C., filtered, diluted to 225 cc. and again precipitated with 900 cc. of an 83% alcohol solution. After half an hour the mother liquor was sucked off and the precipitate was washed twice with an alcohol solution of the same concentration as the mother liquor and three times with undiluted ethanol. The washed precipitate was dried for 15 hours in vacuo at a temperature of 45–50° C. It had a total iron content of 14.9%.

17.0 grams of the dry preparation thus obtained were added with stirring to a solution of 3.5 grams of dulcitol in 40 cc. of distilled water at a temperature of 60° C. After one hour, the solution formed was cooled to room temperature and diluted with distilled water to a volume of 50 cc. After filtering through filter paper and a sterile filter the solution was dispensed in ampoules, which were sterilised in an autoclave at a temperature of 120° C. for 20 minutes. The solution, which was ready for injection, had a total iron content of 55.3 milligrams per cc. and a pH value of 7.6 and gave an absorption of 75% from rabbit muscle.

EXAMPLE XVI

A dry preparation was made in the following way. 30 cc. of a 70% sorbitol solution and 75.0 grams of purified dextrin were dissolved in 225 cc. of distilled water at 60° C.; 52.2 grams of a 50% aqueous solution of gluconic acid were then added. The solution formed was mixed with 22.5 cc. of a solution of 50.0 grams of sodium hydroxide in 250 cc. of distilled water. While continuing the stirring and heating, 200 cc. of the sodium hydroxide solution were added in 8 portions. On the completion of the addition of the base ⅛ of a solution of 84.0 grams of ferric chloride hexahydrate in 115 cc. of distilled water was added. The pH value was adjusted to 8.3 and the reaction mixture was kept at 60° C. for one hour while stirring. Then the solution was cooled to 30° C. and mixed with 2720 cc. of 83% ethanol while stirring. After one hour the mother liquor was sucked off and the precipitate obtained was washed on a Nutsche with 150 cc. of ethanol of the same concentration as the mother liquor. The washed precipitate was dissolved at a temperature of 60° C. in 450 cc. of distilled water containing 8.4 grams of gluconic acid and the pH was adjusted to 8.1. After half an hour the solution was cooled to 30° C., filtered and diluted with distilled water to a volume of 750 cc. The diluted solution was mixed with stirring with 3000 cc. of 83% ethanol and then the mother liquor was poured off. The precipitate obtained was mixed with 150 cc. of diluted alcohol of the same concentration as the mother liquor and was left overnight. The mother liquor was then sucked off and the precipitate was washed twice with 150 cc. of diluted ethanol of the same concentration as the mother liquor and three times with 150 cc. of undiluted ethanol. The washed precipitate was dried for 12 hours at 45–50° C. in vacuo. The product obtained had an iron content of 13.5%.

56.0 grams of dry preparation obtained were added in portions with stirring to a solution of 15 cc. of 70% sorbitol in 105 cc. of distilled water at a temperature of 60° C. After one hour at 60° C. the solution was cooled to room temperature and diluted with distilled water to a volume of 150 cc. The diluted solution was filtered, dispensed in ampoules and sterilised in an autoclave at a temperature of 120° C. for 20 minutes. The sterilised solution had a total iron content of 51:1 milligrams/cc., a pH value of 7.65 and gave an absorption of 87% from rabbit muscle.

EXAMPLE XVII

A dry preparation was obtained in the following way. 30 cc. of a 70% sorbitol solution and 75.0 grams of dextrin were added to 225 cc. of water. On solution of these constituents at 60° C., 11.3 grams of tartaric acid (molecular weight 150.05) were added. To the solution formed, 40 cc. of a solution of 50.0 grams of sodium hydroxide in 250 cc. of distilled water were added. Then 184 cc. of the above base were added in 8 portions. After the addition of each portion ⅛ of a solution of 84.0 grams of ferric chloride hexahydrate in 115 cc. of distilled water was added. On completion of these additions the pH was adjusted to 9.2 and the stirring and heating were continued for another hour. Then the solution was cooled to 30° C. and filtered. To the filtered solution, 2700 cc. of 83% ethanol were added while stirring. After one hour the mother liquor was poured off and the precipitate obtained was washed with 150 cc. of ethanol of the same concentration as the mother liquor. The washed precipitate was dissolved at 60° C. in 450 cc. of distilled water containing 3.9 grams of tartaric acid. The solution formed was stirred for half an hour at 60° C. and was then cooled to 30° C., filtered and diluted with distilled water to a volume of 675 cc. The diluted solution was mixed with 2700 cc. of 83% ethanol while stirring. After half an hour the mother liquor was sucked off and the precipitate was washed twice with 150 cc. of ethanol of the same concentration as the mother liquor and three times with 150 cc. of undiluted ethanol and was dried in vacuo at 45–50° C. for 12 hours. The dried precipitate had an iron content of 14.5%.

53.0 grams of the dry preparation obtained were added in portions to a solution of 15 cc. of 70% sorbitol in 105 cc. of distilled water at 60° C. while stirring. The solution formed was stirred for one hour at this temperature and was then cooled to room temperature, diluted with distilled water to a volume of 150 cc., and filtered. After having been sterilised in an autoclave at a temperature of 120° C. for 20 minutes the solution, which was ready for injection, had a pH value of 8.27 and a total iron content of 51.6 milligrams per cc. It gave an absorption of 62% from rabbit muscle.

EXAMPLE XVIII

A dry preparation was obtained in the following way. 30 cc. of 70% sorbitol and 75.0 grams of dextrin were added to 225 cc. of water. On solution of these constituents at 60° C., 10.0 grams of malic acid were added. To the solution obtained 22.5 cc. of a solution of 50.0 grams of sodium hydroxide in 250 cc. of distilled water were added. Then a solution of 84.0 grams of ferric chloride hexahydrate in 150 cc. of distilled water was added in 8 portions. After the addition of each portion the reaction mixture was neutralised with 23 cc. of the sodium hydroxide solution. After the eighth neutralisation the pH was adjusted to 8.2 and stirring was continued at 60° C. for half an hour, after which the solution was cooled to 30° C. and diluted to a volume of 675 cc. with distilled water. To the diluted solution 2700 cc. of 83% ethanol were added while stirring. After one hour the mother liquor was poured off and the precipitate obtained was washed with 150 cc. of ethanol of the same concentration as the mother liquor. The washed precipitate was dissolved at 60° C. in 450 cc. of distilled water containing 3.0 grams of malic acid and the pH was adjusted to 8.2. After stirring for half an hour at 60° C. the solution formed was cooled to 30° C., filtered and diluted with distilled water to a volume of 750 cc. The diluted solution was mixed with 3000 cc. of 83% ethanol while stirring. After half an hour the mother liquor was poured off and the precipitate obtained was washed twice with 150 cc. of ethanol of the same concentration as the mother liquor and three times with 150 cc. of undiluted ethanol and was dried in vacuo at 45–50° C. for 12 hours. The dried precipitate had an iron content of 15.2%.

50.0 grams of the dry preparation thus obtained were added in portions to a solution of 15 cc. of 70% sorbitol in 105 cc. of distilled water at 60° C. while stirring. After stirring for one hour at this temperature the solution formed was cooled to room temperature, diluted with distilled water to a volume of 150 cc., and filtered. After sterilisation at 120° C. for 20 minutes in an autoclave the solution, now ready for injection, had a pH if 7.4 and a total iron content of 54.6 milligrams/cc. It gave an absorption of 69% from rabbit muscle.

EXAMPLE XIX

By a procedure analogous to that of Example I, injection solutions with an iron content of 50 milligrams/cc. were prepared, using as the ferric compound first ferric ammonium sulphate and second ferric sulphate. Absorption from rabbit muscle was 66% for the preparation made using ferric ammonium sulphate and 77% for that made using ferric sulphate.

EXAMPLE XX

A dry preparation of ferric chloride, sorbitol, citric acid and glucose was prepared, using a procedure analogous to that of Example I, except that only one precipitation with alcohol was carried out. From the dry preparation an injection solution was made containing 52.1 millgrams of iron per cc of solution. This gave an absorption from rabbit muscle of 69%.

EXAMPLE XXI

A dry preparation of ferric chloride, orbitol, citric acid and saccharose was prepared using a procedure analogous to that of Example I. From the dry preparation an injection solution containing 57.3 milligrams of iron per cc. solution was made. This gave an absorption from rabbit muscle of 89%.

EXAMPLE XXII

A dry preparation of ferric chloride, sorbitol, citric acid and dextran with a content of reducing groups per gram corresponding to 275 milligrams of glucose was prepared using a procedure analogous to that of Example I. From the dry preparation an injection solution containing 50.1 milligrams of iron per cc. was made. This gave an absorption from rabbit muscle of 88%.

EXAMPLE XXIII

A dry preparation of ferric chloride, sorbitol, citric acid and dextrin was prepared using a procedure analogous to that of Example I. An injection solution containing 52.1 milligrams of iron per cc. was made from the dry preparation substantially as set forth in Example I, but besides sorbitol a further amount of citric acid corresponding to 5 grams per litre of injection solution was added. This injection solution gave an absorption of 87% from rabbit muscle.

EXAMPLE XXIV

A dry preparation was prepared by dissolving 25 cc. hydroxypropyl-sorbitol (Atlas Powder Company No. G-2401) and 75.0 grams of dextrin in 225 cc. of distilled water. On solution of these constitutents at 60° C., 10.5 grams of citric acid were added. To the solution formed 22.5 cc. of a solution of 45.0 grams of sodium hydroxide in 225 cc. of distilled water were added. Then 84.0 grams of ferric chloride hexahydrate dissolved in 115 cc. of distilled water were added in 8 portions. After each portion of ferric compound, 23 cc. of the above sodium hydroxide solution were added. When the addition of ferric compound and sodium hydroxide was finished the pH of the reaction mixture was adjusted to 8.15. The mixture was kept at the temperature of 60° C. for another 30 minutes, after which it was cooled to room temperature, and diluted to 675 cc. with distilled water. Then 2025 cc. of 83% ethanol were added. After the sedimentation of the resulting precipitate the mother liquor was separated. The precipitate obtained was treated with 150 cc. of alcohol of the same concentration as the mother liquor and then dried on a Nutsche. It was then dissolved at 60° C. with stirring in 450 cc. of distilled water containing 3.0 grams of crystallised citric acid. The pH of the solution was adjusted to 8.2 and heating was continued for some minutes. The solution was then cooled to 30° C., filtered and diluted to 675 cc. with distilled water and once more precipitated with 2025 cc. of 83% alcohol. After half an hour the mother liquor was separated and the precipitate washed twice with 150 cc. of alcohol of the same concentration as the mother liquor and 3 times with concentrated alcohol. The washed precipitate was dried 15 hours in vacuo at a temperature of 45–50° C. Yield: 97.4 grams of a preparation with a total iron content of 15.3%.

49.0 grams of the dried preparation were added in portions to a solution of 12.5 ml. hydroxypropyl-sorbitol in 105 cc. of distilled water at 60° C. while stirring. After 20 minutes the pH of the solution was adjusted to 8.2 with sodium hydroxide. After 1 hour the solution obtained was cooled to room temperature and diluted with distilled water to a volume of 150 cc. After filtering through filter paper and a sterile filter the solution was dispensed in ampoules, which were sterilised in an autoclave at 120° C. for 20 minutes. The prepared injection solution had a total iron content of 54.0 mg./cc. and a pH of 7.1. It gave an absorption of 84% from rabbit muscle after 7 days.

What is claimed is:

1. In a process for the preparation of an iron composition from which a solution suitable for intramuscular injection can be prepared, the steps comprising
   (a) preparing a first aqueous solution containing from about 2% to about 20% by weight of at least one hexitol-component selected from the group consisting of sorbitol, mannitol, dulcitol, iditol and hydroxypropyl sorbitol, from about 1% to about 10% by weight of a hydroxy carboxylic acid selected from the group consisting of citric acid, gluconic acid, tartaric acid and malic acid, and from about 5% to about 50% by weight of a physiologically innocuous water-soluble carbohydrate selected from the group consisting of dextrin, glucose, saccharose and physiologically innocuous low molecular weight dextran fractions as a dispersion stabilizer,
   (b) preparing a second solution containing from about 1 to about 35 moles of a ferric compound for each mole of said hexitol-component in said first solution, said ferric compound being selected from the group consisting of water-soluble ferric salts and double salts of physiologically innocuous acids, and the amount thereof being effective to produce a complex with the hexitol-component and the hydroxy carboxylic acid, and
   (c) combining said first and said second solutions while concomitantly adjusting the pH of the resulting mixture to a value between about 5 and about 10, the aforesaid steps being carried out at a temperature between about 18° and about 130° C.

2. A process according to claim 1, wherein said hexitol component is sorbitol, said hydroxycarboxylic acid is citric acid, said dispersion stabilizer is dextrin, and said ferric compound is ferric chloride.

3. A process according to claim 1, wherein said hexitol component is selected from the group consisting of mannitol and dulcitol, said hydroxycarboxylic acid is citric acid, said dispersion stabilizer is dextrin, and said ferric compound is ferric chloride.

4. A process according to claim 1, wherein said hexitol component is sorbitol, said hydroxycarboxylic acid is a gluconic acid, said dispersion stabilizer is dextrin, and said ferric compound is ferric chloride.

5. A process according to claim 1, wherein said hexitol component is sorbitol, said hydroxycarboxylic acid is citric acid, said dispersion stabilizer is dextrin, and said ferric compound is ferric sulfate.

6. A process according to claim 1, wherein said hexitol component is sorbitol, said hydroxycarboxylic acid is citric acid, said dispersion stabilizer is selected from the group consisting of saccharose and low molecular weight dextran fractions, and said ferric compound is ferric chloride.

7. A process for the preparation of a precipitated iron complex from which a preparation suitable for intramuscular injection can be prepared comprising
   (a) preparing a first aqueous solution containing from about 2% to about 20% by weight of at least one hexitol-component selected from the group consisting of sorbitol, mannitol, dulcitol, iditol and hydroxypropoxyl sorbitol, from about 1% to about 10% by weight of at least one hydroxy carboxylic acid selected from the group consisting of citric acid, gluconic acid, tartaric acid and malic acid, and from about 5% to about 50% by weight of a physiologically innocuous water-soluble carbohydrate selected from the group consisting of dextrin, glucose, saccharose and physiologically innocuous low molecular weight dextran fractions as a dispersion stabilizer,
   (b) preparing a second solution containing from about 1 to about 35 moles of a ferric compound for each mole of said hexitol-component in said first solution, said ferric compound being selected from the group consisting of water-soluble ferric salts and ferric double salts of physiologically innocuous acids, and the amount thereof being effective to produce a complex with the hexitol-component and hydroxy carboxylic acid,
   (c) adding said second solution to said first solution while concomitantly adjusting the pH of the reaction mixture to a value between about 5 and about 10, the aforesaid steps being carried out at a temperature between about 18° and about 130° C., whereby an iron complex is formed,
   (d) purifying said iron complex by precipitating said complex at least once from a solution thereof, and
   (e) separating the precipitated complex from said solution.

8. A process according to claim 7, wherein said complex is precipitated by adding from 2 to 4 volumes of ethyl alcohol per volume of solution of said complex.

9. A process for preparing a solution of an iron complex suitable for intramuscular injection in human and veterinary medicine comprising dissolving a sufficient amount of an iron complex to form a solution containing from about 5 to about 60 milligrams of iron per milliliter of solution in an aqueous solution of a hexitol-component containing 70 to 100 grams of said hexitol-component per liter, said iron complex consisting essentially of iron in the ferric state, a hexitol-component selected from the group consisting of sorbitol, mannitol, dulcitol, iditol and hydroxypropyl sorbitol, and a hydroxy carboxylic acid selected from the group consisting of citric acid, gluconic acid, tartaric acid and malic acid, there being in said complex from about 5% to about 30% of said iron, and a sufficient amount of said hexitol-component and said hydroxy carboxylic acid that when an amount of said complex containing from 5 to 60 milligrams of iron is dispersed in 1 milliliter of water, the resulting dispersion contains from about 10 to about 300 milligrams of said hexitol-component and from about 10 to 70 milligrams of said hydroxy carboxylic acid, said complex further containing from about 40% to about 90% of a physiologically innocuous water soluble carbohydrate selected from the group consisting of dextrin, glucose, saccharose and physiologically innocuous low molecular weight dextrin fractions as a dispersion stabilizer, and said complex, when dispersed in a physiological saline solution at a concentration of 1 milligram of iron per cubic centimeter of solution, forming a dispersion in which at least the major part by weight of particles exhibits a sedimentation constant of less than about $17 \times 10^{-13}$ second.

10. A process according to claim 9, wherein said solution is filtered, adjusted to a pH of 8.0 to 8.4, and sterilized by heating.

11. A stabilized complex of iron, a hexitol-component selected from the group consisting of sorbitol, mannitol, dulcitol, iditol and hydroxypropyl sorbitol and a hydroxy carboxylic acid selected from the group consisting of citric acid, gluconic acid, tartaric acid and malic acid, with a physiologically innocuous water-soluble carbohydrate selected from the group consisting of dextrin, glucose, saccharose and physiologically innocuous low molecular weight dextran fractions as a dispersion stabilizer, said complex consisting essentially of about 5% to about 30% by weight of iron in the ferric state, from about 40% to about 90% by weight of said physiologically innocuous water-soluble carbohydrate, and a sufficient amount of said hexitol-component and said hydroxy carboxylic acid that when an amount of said complex containing from about 5 to about 60 milligrams of iron is dispersed in water, the resulting dispersion contains from about 10 to about 300 milligrams of said hexitol-component and from about 10 to about 70 milligrams of said hydroxy carboxylic acid, and said complex, when dispersed in a physiological saline solution at a concentration of 1 milligram of iron per cubic centimeter of solution, forming a dispersion in which at least the major part by weight of the particles exhibits a sedimentation constant of less than $17 \times 10^{-13}$ second.

12. A stabilized iron complex according to claim 11 wherein said hexitol-component is hydroxypropyl sorbitol, said hydroxy carboxylic acid is citric acid and said dispersion stabilizer is dextrin.

13. An iron complex dispersion suitable for intramuscular injection in human and veterinary medicine consisting essentially of an aqueous dispersion of a stabilized complex of iron in the ferric state, a hexitol-component selected from the group consisting of sorbitol, mannitol, dulcitol, iditol and hydroxypropyl sorbitol, and a hydroxy carboxylic acid selected from the group consisting of citric acid, gluconic acid, tartaric acid and malic acid, said complex being stabilized by a physiologically innocuous, water-soluble carbohydrate selected from the group consisting of dextrin, glucose, saccharose and physiologically innocuous low molecular weight dextran fractions, there being, per milliliter of said dispersion, from about 5 to about 60 milligrams of said iron, from about 10 to about 300 milligrams of said hexitol-component, from 10 to 70 milligrams of said hydroxy carboxylic acid and from about 150 to about 350 milligrams of said physiologically innocuous, water-soluble carbohydrate, said stabilized complex, when dispersed in a physiological saline solution, at a concentration of 1 milligram of iron per cubic centimeter of solution, forming a dispersion in which at least the major part by weight of the particles exhibits a sedimentation constant of less than $17 \times 10^{-13}$ second.

14. A stabilized iron complex according to claim 11, wherein said hexitol-component is sorbitol, said hydroxy carboxylic acid is citric acid, and said dispersion stabilizer is dextrin.

15. A stabilized iron complex according to claim 11, wherein said hexitol-component is selected from the group consisting of mannitol and dulcitol, said hydroxy carboxylic acid is citric acid, and said dispersion stabilizer is dextrin.

16. A stabilized iron complex according to claim 11, wherein said hexitol-component is sorbitol, said hydroxy carboxylic acid is gluconic acid, and said dispersion stabilizer is dextrin.

17. A stabilized iron complex according to claim 11, wherein said hexitol-component is sorbitol, said hydroxy carboxylic acid is citric acid, and said dispersion stabilizer is selected from the group consisting of saccharose and low molecular weight dextran fraction.

18. A stabilized iron complex according to claim 11, said complex, when dispersed in a physiological saline solution at a concentration of 1 milligram of iron per cubic centimeter of solution, forming a dispersion in which at least about 90% by weight of the particles exhibits a sedimentation constant of less than about $17 \times 10^{-13}$ second.

19. A stabilized iron complex according to claim 11, wherein said hexitol-component is sorbitol, said hydroxy carboxylic acid is citric acid, said dispersion stabilizer is dextrin, and said ferric compound is ferric chloride, said complex, when dispersed in a physiological saline solution at a concentration of 1 milligram of iron per cubic centimeter of solution, forming a dispersion in which at least 90% by weight of the particles exhibits a sedimentation constant of less than $17 \times 10^{-13}$ second.

20. A process for the preparation of a precipitated iron complex from which a preparation suitable for intramuscular injection can be prepared comprising
 (a) preparing a first aqueous solution of from about 2% to about 20% by weight of hydroxyl propyl sorbitol, from about 1% to about 10% by weight of a hydroxy carboxylic acid selected from the group consisting of citric acid, gluconic acid, tartaric acid and malic acid, and from about 5% to about 50% by weight of a physiologically innocuous water-soluble carbohydrate selected from the group consisting of dextrin, glucose, saccharose and physiologically innocuous low molemular weight dextran fractions as a dispersion stabilizer,
 (b) preparing a second solution containing from about 1 to about 35 moles of a ferric compound for each mole of said hydroxy propyl sorbitol in said first solution, said ferric compound being selected from the group consisting of water-soluble ferric salts and ferric double salts of physiologically innocuous acids and the amount thereof being effective to produce a complex with said hydroxypropyl sorbitol and hydroxy carboxylic acid,
 (c) adding said second solution to said first solution while concomitantly adjusting the pH of the mixture to a value between about 5 and about 10, the aforesaid steps being carried out at a temperature between about 18° C. to about 130° C. whereby an iron complex is formed.

References Cited by the Examiner

UNITED STATES PATENTS

| 2,982,690 | 5/1961 | Ratcliff | 167—68 |
| 3,070,506 | 12/1962 | Linkenheimer et al. | 167—68 |

FOREIGN PATENTS 862,482  1/1953  Germany.

FRANK CACCIAPAGLIA, Jr., *Primary Examiner.*

UNITED STATES PATENT OFFICE
CERTIFICATE OF CORRECTION

Patent No. 3,252,863                                      May 24, 1966

Sven Lindvall et al.

It is hereby certified that error appears in the above numbered patent requiring correction and that the said Letters Patent should read as corrected below.

Column 1, line 38, for "ar eunsuitable" read -- are unsuitable --; column 4, line 17, after "For" insert -- a --; line 22, after "a" insert -- function --; column 5, line 27, for "th" read -- the --; line 72, for "where" read -- were --; column 6, line 10, after "non-protein" insert -- nitrogen --; line 30, after "them" insert -- even --; line 47, for "or", second occurrence, read -- of --; column 7, line 70, for "there" read -- they --; column 10, line 74, after "of" insert -- the --; column 12, line 19, for "if" read -- of --; line 38, for "millgrams" read -- milligrams --; line 42, for "orbitol" read -- sorbitol --; column 14, line 26, for "propoxyl" read -- propyl --; column 15, line 7, for "dextrin" read -- dextran --; column 16, line 45, for "molemular" read -- molecular --.

Signed and sealed this 22nd day of August 1967.

(SEAL)
Attest:

ERNEST W. SWIDER                                EDWARD J. BRENNER
Attesting Officer                              Commissioner of Patents